US012732104B2

(12) United States Patent
Mallik et al.

(10) Patent No.: US 12,732,104 B2
(45) Date of Patent: Sep. 8, 2026

(54) SYSTEMS AND METHODS TO BALANCE FLYING CAPACITORS IN HIGH POWER MULTI-LEVEL BUCK OR BOOST CONVERTERS FOR RENEWABLE AND SOLAR MAXIMUM POWER POINT TRACKING (MPPT) INVERTER APPLICATIONS

(71) Applicant: STMicroelectronics International N.V., Geneva (CH)

(72) Inventors: Ranajay Mallik, Noida (IN); Akshat Jain, Nahan (IN)

(73) Assignee: STMicroelectronics International N.V., Geneva (CH)

( * ) Notice: Subject to any disclaimer, the term of this patent is extended or adjusted under 35 U.S.C. 154(b) by 158 days.

(21) Appl. No.: 18/829,665

(22) Filed: Sep. 10, 2024

(65) Prior Publication Data

US 2026/0074620 A1 Mar. 12, 2026

(51) Int. Cl.
*H02M 3/158* (2006.01)
*H02J 3/38* (2006.01)
(Continued)

(52) U.S. Cl.
CPC ............. *H02M 3/158* (2013.01); *H02J 3/381* (2013.01); *H02M 1/0095* (2021.05); *H02M 3/07* (2013.01); *H02J 2101/25* (2026.01)

(58) Field of Classification Search
CPC .... H02M 3/1582; H02M 3/155; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19;
(Continued)

(56) References Cited

U.S. PATENT DOCUMENTS 9,825,545 B2 * 11/2017 Chen ..................... H02M 3/335
10,615,697 B1 4/2020 Ferrari et al.
(Continued)

OTHER PUBLICATIONS

Antoni, Viktor, "Flying Capacitor Booster", Vincotech, (2020), 17 pages, available at https://www.vincotech.com/fileadmin/user_upload/content_media/documents/pdf/support-documents/technical-papers/Vincotech TP 2020-08 Flying Capacitor Booster.pdf.

*Primary Examiner* — Jeffrey A Gblende
(74) *Attorney, Agent, or Firm* — ALSTON & BIRD LLP

(57) ABSTRACT

Apparatuses, systems, and methods to balance flying capacitors in high power multi-level buck or boost converters for renewable and solar maximum power point tracking (MPPT) inverter applications are provided. An exemplary method includes initializing at least a multi-level converter circuitry and an isolated secondary converter circuitry, wherein the multi-level converter circuitry includes at least a flying capacitor, and wherein the isolated secondary converter circuitry is configured to charge the flying capacitor in accordance with a default operation state in response to initialization; determining that a voltage across the flying capacitor satisfies a threshold; and causing the isolated secondary converter circuitry to switch from the default operation state to an inactive state based at least in part on the voltage satisfying the threshold.

20 Claims, 6 Drawing Sheets

(51) Int. Cl.
*H02M 1/00* (2006.01)
*H02M 3/07* (2006.01)
*H02J 101/24* (2026.01)

(58) Field of Classification Search
CPC .... H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02M 3/07; H02M 3/073; H02M 2003/071; H02M 2003/072; H02M 2003/075; H02M 2003/076; H02M 2003/077; H02M 2003/078; H02M 2001/0048; H02J 3/46; H02J 3/38
See application file for complete search history.

(56) References Cited

U.S. PATENT DOCUMENTS 12,401,275 B2 * 8/2025 Szczeszynski .......... H02M 3/07
2014/0232364 A1 8/2014 Thomas et al.
2015/0180355 A1 6/2015 Freeman et al.
2021/0159790 A1 5/2021 Tseng et al.
2022/0231601 A1 7/2022 Jong et al.
2024/0186915 A1 6/2024 Abarzadeh et al.
2024/0223074 A1 7/2024 Huber et al.
2024/0223077 A1 * 7/2024 Low ...................... H02M 3/158

* cited by examiner

FIG. 4A
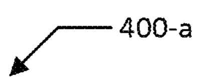
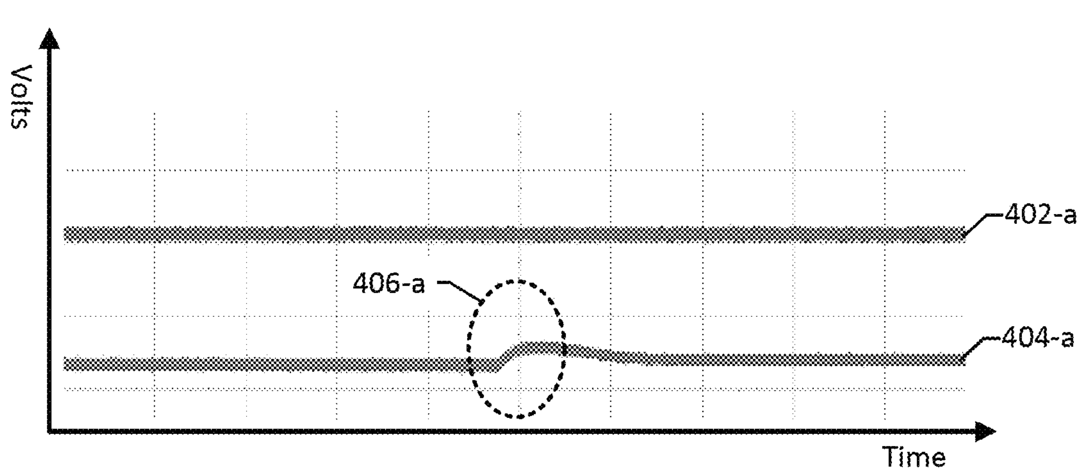
FIG. 4B
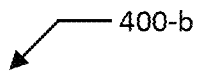
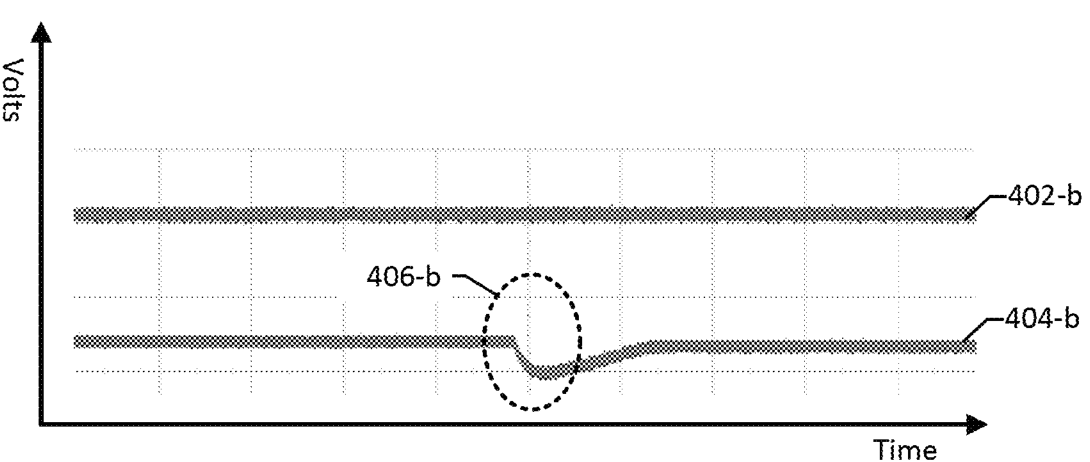

Figure 5:
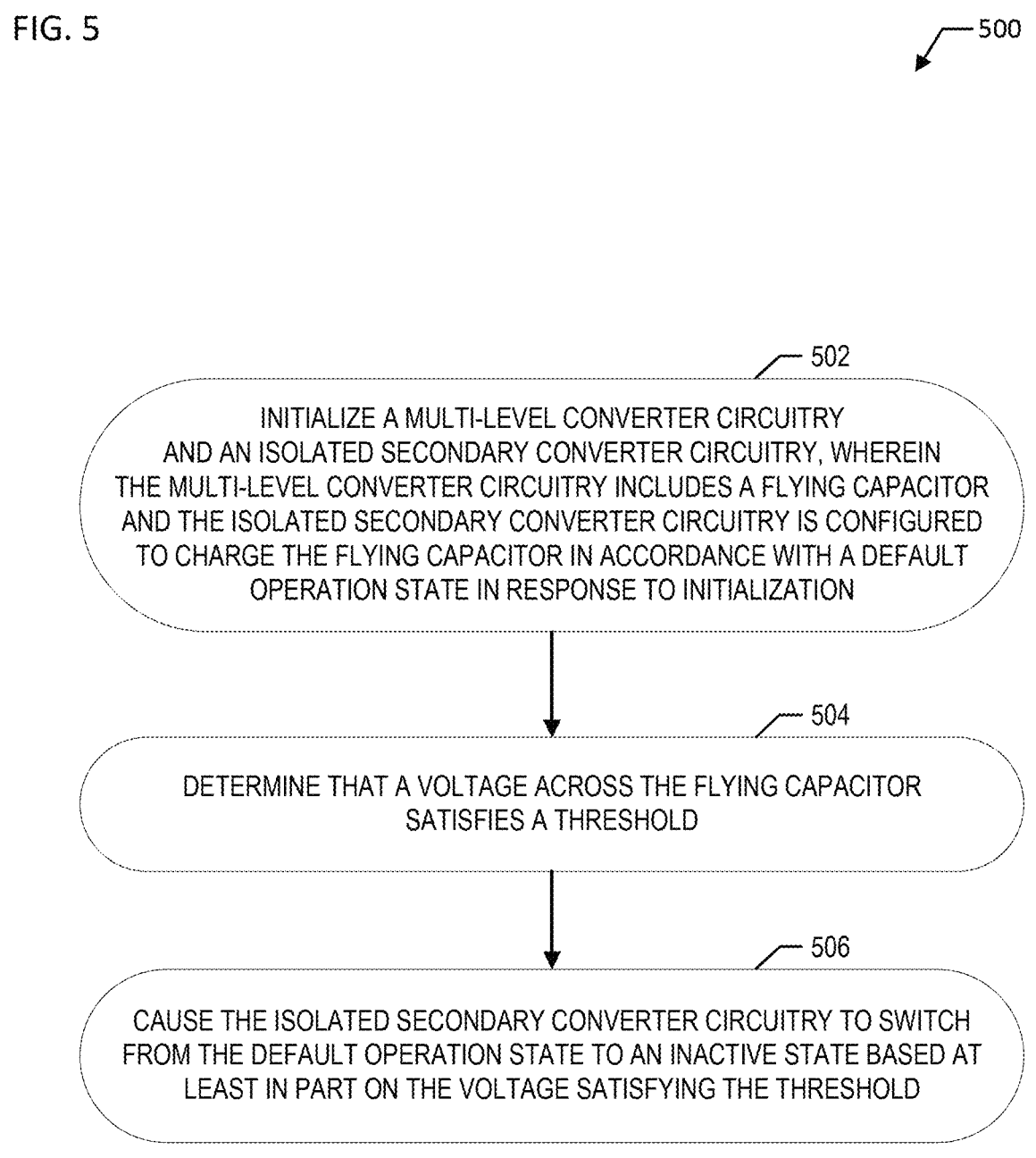

INITIALIZE A MULTI-LEVEL CONVERTER CIRCUITRY AND AN ISOLATED SECONDARY CONVERTER CIRCUITRY, WHEREIN THE MULTI-LEVEL CONVERTER CIRCUITRY INCLUDES A FLYING CAPACITOR AND THE ISOLATED SECONDARY CONVERTER CIRCUITRY IS CONFIGURED TO CHARGE THE FLYING CAPACITOR IN ACCORDANCE WITH A DEFAULT OPERATION STATE IN RESPONSE TO INITIALIZATION

504

DETERMINE THAT A VOLTAGE ACROSS THE FLYING CAPACITOR SATISFIES A THRESHOLD

506

CAUSE THE ISOLATED SECONDARY CONVERTER CIRCUITRY TO SWITCH FROM THE DEFAULT OPERATION STATE TO AN INACTIVE STATE BASED AT LEAST IN PART ON THE VOLTAGE SATISFYING THE THRESHOLD 600
602
PROCESSOR
606
COMMUNICATION CIRCUITRY
612
604
MEMORY
608
INPUT/OUTPUT CIRCUITRY
610
CAPACITOR BALANCING CIRCUITRY
MULTI-LEVEL CONVERTER CIRCUITRY 614
SECONDARY CONVERTER CIRCUITRY 616
VOLTAGE SENSE CIRCUITRY 618

SYSTEMS AND METHODS TO BALANCE FLYING CAPACITORS IN HIGH POWER MULTI-LEVEL BUCK OR BOOST CONVERTERS FOR RENEWABLE AND SOLAR MAXIMUM POWER POINT TRACKING (MPPT) INVERTER APPLICATIONS

TECHNOLOGICAL FIELD

Example embodiments of the present disclosure relate generally to systems, apparatuses, and methods to balance flying capacitors in high power multi-level buck or boost converters for renewable and solar maximum power point tracking (MPPT) inverter applications.

BACKGROUND

Some renewable energy and high voltage electric vehicle (EV) applications utilize relatively high operating voltages, such as operating voltages of about 800 volts (V) and above. Multi-level converters may be used in combination with low-voltage power devices to support these operating voltages. Some multi-level converters, however, are associated with hardware and software challenges. For example, some multi-level converters, such as 3-level buck or boost converters, rely on flying capacitors to provide an intermediate operating voltage that constrains the device stress to less than a source voltage, which may an input voltage to the multi-level converter or an output voltage from the multi-level converter. The flying capacitor voltage is therefore constrained to half the source voltage. In some cases, a multi-level converter may incur damage if the flying capacitor voltage deviates from half the source voltage.

New systems and methods for balancing flying capacitors in high power multi-level buck or boost converters are needed. The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to systems, apparatuses, and methods to balance flying capacitors in high power multi-level buck or boost converters for renewable and solar MPPT inverter applications.

In accordance with some embodiments of the present disclosure, an example system is provided. The example system comprises: a multi-level converter circuitry configured to convert a first voltage provided at a first node into a second voltage provided at a second node, wherein the multi-level converter circuitry includes at least a flying capacitor and a plurality of switches coupled to the flying capacitor; and an isolated secondary converter circuitry configured to charge the flying capacitor to a target voltage in accordance with a default operation state, wherein the isolated secondary converter circuitry is configured to switch from the default operation state to an inactive state in response to at least a first event.

In some embodiments, the system further comprises a control circuitry configured to output a first control signal to the isolated secondary converter circuitry in response to detecting the first event, and wherein the isolated secondary converter circuitry is configured to operate in accordance with the inactive state in response to receiving the first control signal.

In some embodiments, the control circuitry is configured to refrain from outputting the first control signal to the isolated secondary converter circuitry in response to detecting a second event, and wherein the isolated secondary converter circuitry is configured to operate in accordance with the default operation state in the absence of the first control signal.

In some embodiments, the control circuitry is configured to refrain from outputting the first control signal for a first duration that is based at least in part on a second duration over which the isolated secondary converter circuitry charges the flying capacitor to the target voltage.

In some embodiments, the first event comprises a voltage across the flying capacitor satisfying a threshold associated with the flying capacitor, and wherein the second event comprises the voltage failing to satisfy the threshold.

In some embodiments, the threshold is based at least in part on the target voltage.

In some embodiments, the isolated secondary converter circuitry is configured to operate in an open loop.

In some embodiments, the isolated secondary converter circuitry is configured to charge the flying capacitor by converting a reference voltage provided at a third node into the target voltage, and wherein the reference voltage comprises the first voltage or the second voltage based at least in part on an operation mode of the multi-level converter circuitry.

In some embodiments, the target voltage comprises half the reference voltage.

In some embodiments, the first voltage is higher than the second voltage based at least in part on the multi-level converter circuitry operating in accordance with a first operation mode, and wherein the reference voltage comprises the first voltage based at least in part on the first voltage being higher than the second voltage.

In some embodiments, the first operation mode comprises a buck mode.

In some embodiments, the second voltage is higher than the first voltage based at least in part on the multi-level converter circuitry operating in accordance with a second operation mode, and wherein the reference voltage comprises the second voltage based at least in part on the second voltage being higher than the first voltage.

In some embodiments, the second operation mode comprises a boost mode.

In some embodiments, the plurality of switches comprises at least four switches.

In accordance with some embodiments of the present disclosure, an example apparatus is provided. The example apparatus comprises at least one processor; and at least one memory having computer program code stored thereon that, in execution with the at least one processor, causes the apparatus at least to: initialize at least a multi-level converter circuitry and an isolated secondary converter circuitry, wherein the multi-level converter circuitry includes at least a flying capacitor, and wherein the isolated secondary converter circuitry is configured to charge the flying capacitor in accordance with a default operation state in response to initialization; determine that a voltage across the flying capacitor satisfies a threshold; and cause the isolated secondary converter circuitry to switch from the default operation state to an inactive state based at least in part on the voltage satisfying the threshold.

In some embodiments, to cause the isolated secondary converter circuitry to switch from the default operation state to the inactive state, the computer program code, in execution with the at least one processor, causes the apparatus at least to cause a control circuitry to output a first control signal to the isolated secondary converter circuitry, wherein the isolated secondary converter circuitry is configured to operate in accordance with the inactive state in response to receiving the first control signal.

In some embodiments, the computer program code, in execution with the at least one processor, causes the apparatus at least to determine that a second voltage across the flying capacitor fails to satisfy the threshold; and cause the isolated secondary converter circuitry to switch from the inactive state to the default operation state based at least in part on the second voltage failing to satisfy the threshold.

In some embodiments, to cause the isolated secondary converter circuitry to switch from the inactive state to the default operation state, the computer program code, in execution with the at least one processor, causes the apparatus at least to cause the control circuitry to refrain from outputting the first control signal to the isolated secondary converter circuitry, wherein the isolated secondary converter circuitry is configured to operate in accordance with the default operation state in the absence of the first control signal.

In accordance with some embodiments of the present disclosure, an example method is provided. The example method comprises initializing at least a multi-level converter circuitry and an isolated secondary converter circuitry, wherein the multi-level converter circuitry includes at least a flying capacitor, and wherein the isolated secondary converter circuitry is configured to charge the flying capacitor in accordance with a default operation state in response to initialization; determining that a voltage across the flying capacitor satisfies a threshold; and causing the isolated secondary converter circuitry to switch from the default operation state to an inactive state based at least in part on the voltage satisfying the threshold.

In some embodiments, causing the isolated secondary converter circuitry to switch from the default operation state to the inactive state comprises causing a control circuitry to output a first control signal to the isolated secondary converter circuitry, wherein the isolated secondary converter circuitry is configured to operate in accordance with the inactive state in response to receiving the first control signal.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those summarized here, some of which will be further described below.

BRIEF SUMMARY OF THE DRAWINGS

Figure 1:
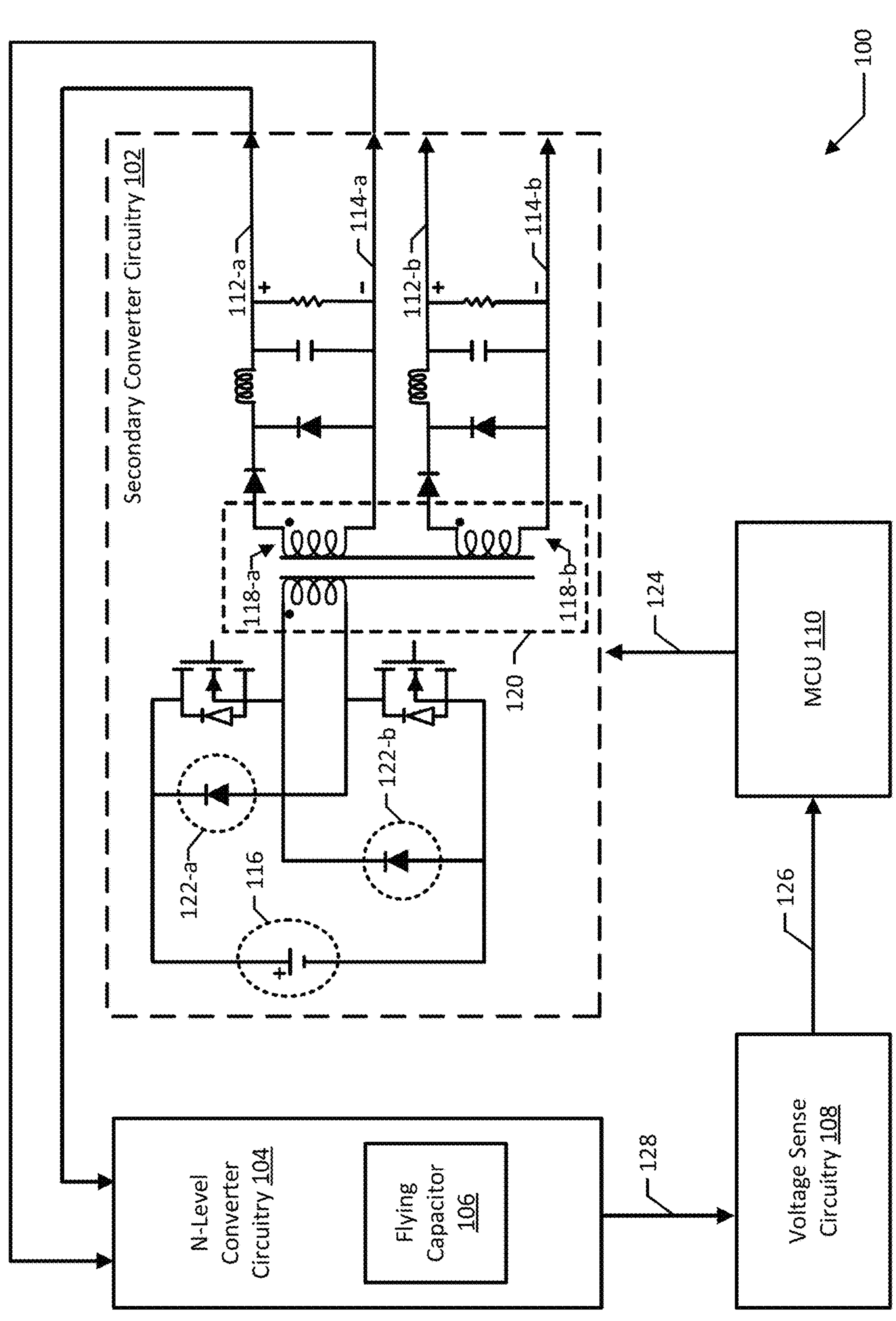
Figure 2:
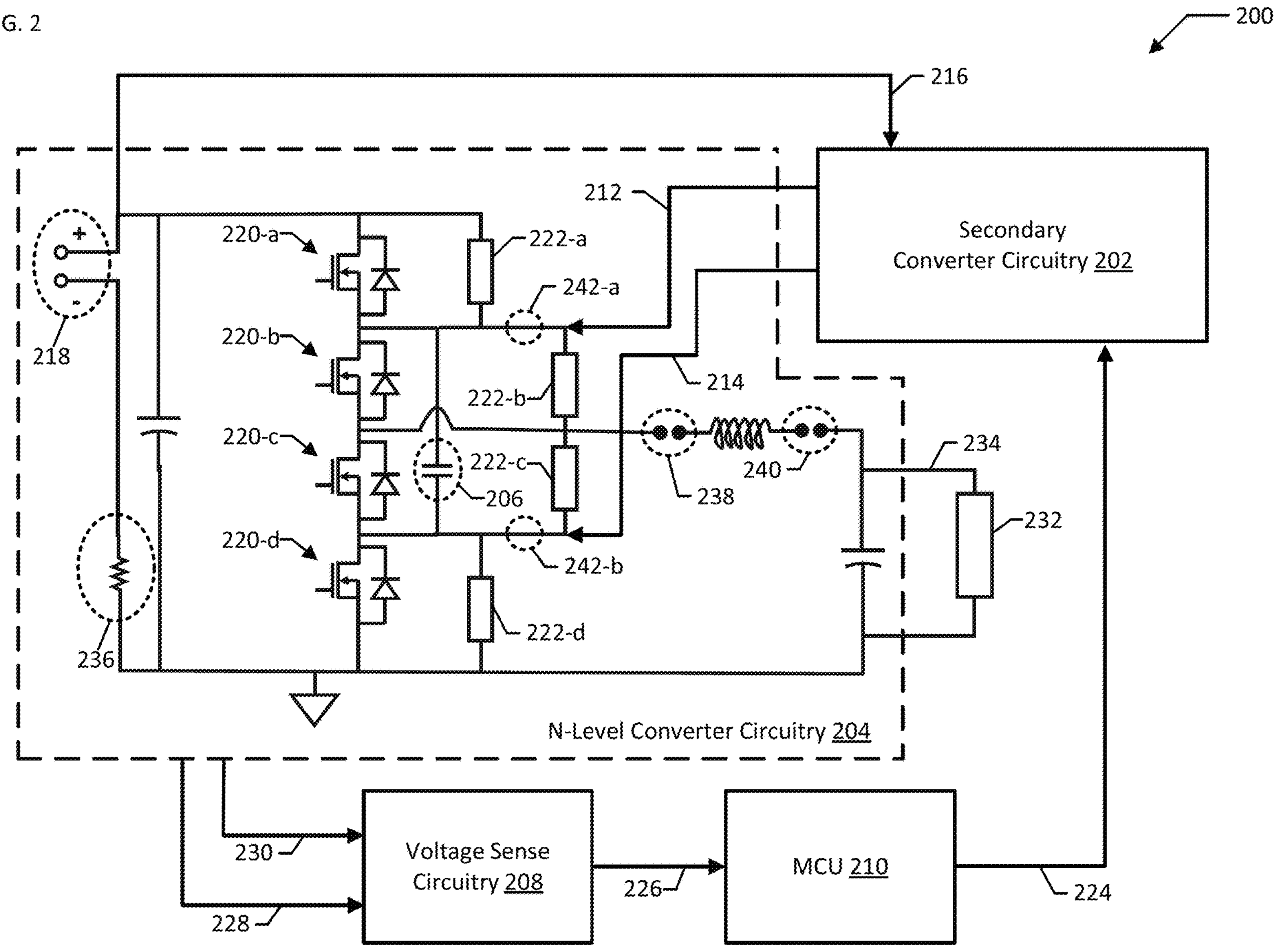
Figure 3:
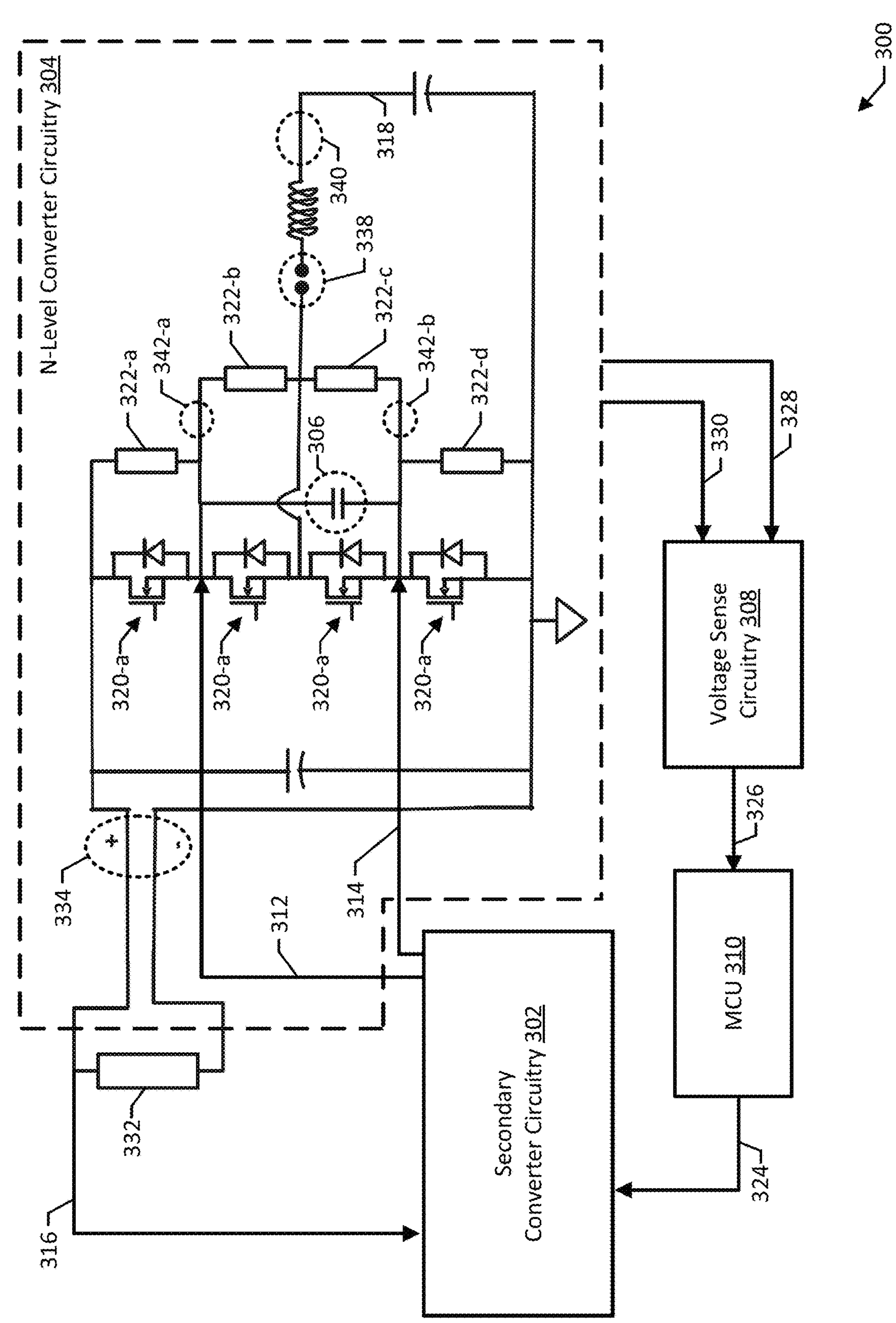
Figure 6:
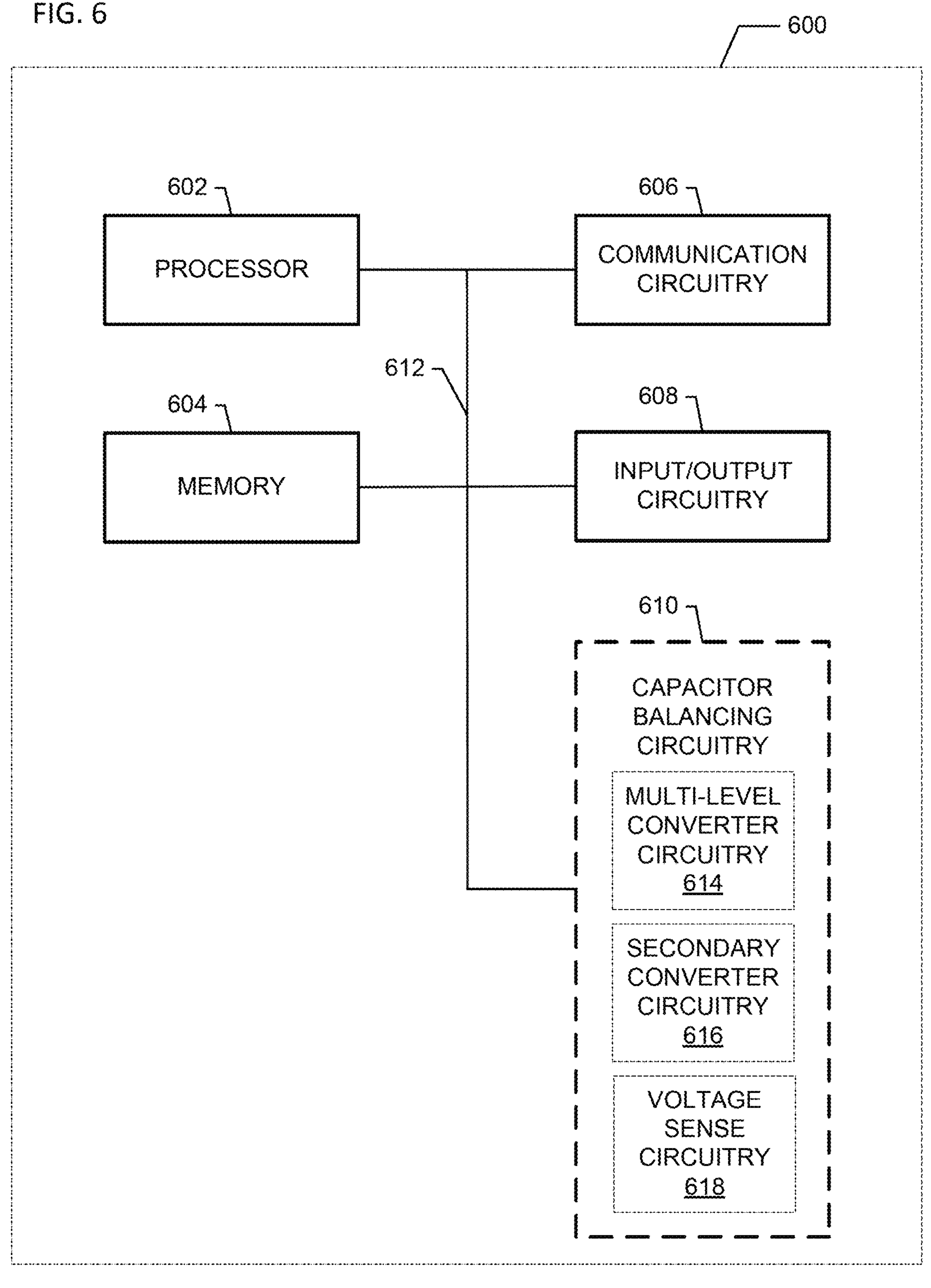

Having thus described certain example embodiments of the present disclosure in general terms, reference will now be made to the accompanying drawings, which are not necessarily drawn to scale, and wherein:

FIG. 1 illustrates an exemplary diagram of a system configured to balance flying capacitors in high power multi-level buck or boost converters for renewable and solar MPPT inverter applications in accordance with one or more embodiments of the present disclosure;

FIG. 2 illustrates an exemplary diagram of a system configured to balance flying capacitors in high power multi-level buck converters for renewable and solar MPPT inverter applications in accordance with one or more embodiments of the present disclosure;

FIG. 3 illustrates an exemplary diagram of a system configured to balance flying capacitors in high power multi-level boost converters for renewable and solar MPPT inverter applications in accordance with one or more embodiments of the present disclosure;

FIGS. 4A and 4B illustrate exemplary graphs of a flying capacitor voltage of a flying capacitor in a system configured to balance flying capacitors in high power multi-level buck or boost converters for renewable and solar MPPT inverter applications in accordance with one or more embodiments of the present disclosure;

FIG. 5 illustrates a flowchart of operations that support systems and methods to balance flying capacitors in high power multi-level buck or boost converters for renewable and solar MPPT inverter applications in accordance with one or more embodiments of the present disclosure; and FIG. 6 illustrates an exemplary device that support systems and methods to balance flying capacitors in high power multi-level buck or boost converters for renewable and solar MPPT inverter applications in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like, generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

As used herein, the term "isolated converter circuitry," and the like, means converter circuitry including at least two parts in which there is no direct conduction path between the two parts of the circuitry. For example, an isolated converter circuitry may include an input stage and an output stage, in which there is no direct conduction path between the input stage and the output stage. In some examples, the input stage and the output stage of an isolated converter circuitry have separate grounds. Conversely, in a non-isolated converter circuitry, the input stage and the output stage may share a common ground, such that current is able to flow directly between the two parts. In some embodiments, isolation is achieved in an isolated converter circuitry through electrical insulation, such as with air or a non-conductive material. In some embodiments, isolation is achieved by incorporating a transformer into the circuit so that power is transferred using electromagnetic energy.

As used herein, the term "charge a capacitor," and the like, means to provide equal and opposite voltages to conductive plates of a capacitor in an uncharged or partially charged state, such that current flows to the conductive plates and generates a voltage across the capacitor that is substantially equal to the magnitude of the provided voltages. In some embodiments, the magnitude of the provided voltages is referred to as a target voltage. In some embodiments, a duration over which a capacitor is charged includes a duration between a first time at which current starts to flow from a voltage source providing the voltages to the conductive plates of the capacitor, and a second time at which the voltage across the capacitor becomes equal to the magnitude of the voltages provided by the voltage source.

The term "a default operation state," as used herein with respect to circuitry or components therefore in a system or an apparatus, means an operation state the circuitry initially operates in accordance with and automatically reverts to. In some embodiments, the circuitry will continue to operate in the default operation state unless the circuitry is triggered to operate in an alternative state. In some such embodiments, the circuitry will continue to operate in the default operation state unless the circuitry receives signaling that triggers the circuitry to operate in an alternative state. In some embodiments, the circuitry will automatically revert to the default operation state in the absence of signaling that triggers the circuitry to operate in an alternative state. In some other embodiments, the circuitry will automatically revert to the default operation state after operating in an alternative state for a preconfigured duration. In some embodiments, a default operation state includes converting a reference voltage into a target voltage and providing the target voltage to conductive plates of a capacitor, such that the capacitor may be charged to the target voltage.

The term "inactive state," as used herein with respect to circuitry or components therefore in a system or an apparatus, means a state in which the circuitry refrains from performing one or more configured functionalities. In some embodiments, when an isolated converter circuitry operates in accordance with an inactive state, the isolated converter circuitry stops charging a capacitor to a target voltage.

The term "initialization," and the like, as used herein with respect to circuitry or components therefore in a system or an apparatus, means to causes the circuitry to start performing one or more configured functionalities. In some embodiments, circuitry operates in accordance with a default operation state in response to initialization.

The term "open loop," and the like, as used herein with respect to circuitry or components therefore in a system or an apparatus, means circuitry that lacks a feedback loop and is incapable of monitoring and/or adjusting functionality of the circuitry based on the output of the circuitry.

Overview

Some renewable energy and high voltage electric vehicle (EV) applications utilize operating voltages of about 800 V and above. Some power devices have relatively low operating voltages, such as operating voltages of about 650 V or less, and are therefore not suitable for direct use in such applications. Some other power devices have relatively high operating voltages, such as operating voltages of about 1200 V or more, and are suitable for direct use in renewable energy and high voltage EV applications. However, such power devices are relatively expensive and can substantially increase costs for manufactures.

In some cases, to reduce manufacturing costs, as well as device stress for high-voltage applications, manufacturers may use multi-level converters in combination with low-voltage power devices. Some multi-level converters, however, are associated with hardware and software challenges. For example, some multi-level converters, such as multi-level buck and boost converters, rely on flying capacitors to provide an intermediate operating voltage that restricts the device stress to less than a source voltage (e.g., a maximum source voltage). Consequently, the flying capacitor voltage is constrained to half the source voltage (e.g., must be half the source voltage). For instance, a flying capacitor in a 3-level buck converter may be constrained to half of the input voltage, while a flying capacitor in a 3-level boost converter may be constrained to half the output voltage. In some cases, a multi-level converter may incur damage if the flying capacitor voltage deviates from half the source voltage. The source voltage may also be referred to herein as a reference voltage. For instance, the multi-level converter may incur irreparable damage if the flying capacitor voltage falls below half the source voltage by a threshold amount (e.g., by about 15-20%). Additionally, the flying capacitor, which serves as a virtual power supply for switches of a multi-level converter, may be discharged upon initialization of the multi-level converter, thereby increasing device stress. That is, start-up of the multi-level converter may be relatively complex because the flying capacitor is initially discharged, which causes the voltage stress across two switches to become destructive. Some systems may employ methods for balancing flying capacitors. However, some methods for balancing flying capacitors may be constrained to systems with two switches, such as two metal-oxide-semiconductor field-effect transistors (MOSFETs), and two diodes. Consequently, such methods are incompatible with other multi-level systems, such as multi-level systems that employ a four switch design (e.g., a four MOSFET design).

Various aspects of the present disclosure are directed to improved systems, apparatuses, and methods for balancing flying capacitors in high power multi-level converters, such as for renewable and solar MPPT inverter applications. Among other aspects, the present disclosure provides improved systems, apparatuses, and methods for balancing flying capacitors in advanced digital power conversion applications, such as power conversion applications involving SiC multi-level converters (e.g., for powers greater than about 5 kilowatts (kW)).

In accordance with various aspects of the present disclosure, a system may include a secondary converter to balance one or more flying capacitors in a multi-level converter, such as a multi-level buck converter or a multi-level boost converter. In some embodiments, the secondary converter is configured to balance the voltage of the one or more flying capacitors unconditionally and also at startup. The multi-level converter may include 3 or more levels. That is, in some embodiments, the multi-level converter includes any N-level converter, in which N is greater than or equal to 3. In some embodiments, the secondary converter may include an isolated, multi-output, forward derived converter configured to run in an open-loop. For example, the secondary converter may be an example of a converter that uses a transformer to generate an output voltage and provide isolation (e.g., galvanic isolation) for a load. In some embodiments, the transformer may include multiple secondary windings to generate multiple output voltages, which may have the same or different values.

In some embodiments, the present disclosure provides for a system that includes a multi-level converter with a flying capacitor and a secondary converter configured to charge the flying capacitor to a target voltage (e.g., half the source voltage) in accordance with a default operation state. In some such embodiments, the secondary converter is configured to switch (to only switch) from the default operation state to an inactive state in response to one or more events. Accordingly, in such embodiments, the secondary converter is configured to charge the flying capacitor to the target voltage unconditionally, and at start up (e.g., in response to initialization).

In some embodiments, the system may include a microcontroller unit (MCU) configured to monitor (constantly monitor) the voltage across the flying capacitor while the multi-level converter is running. In some such embodiments, if the MCU determines that the voltage of the flying capacitor satisfies a threshold (e.g., is equal to the target voltage), the MCU may use a control signal to trigger the secondary converter to switch from the default operation state to the inactive state. That is, an event may include the MCU determining that the voltage of the flying capacitor satisfies the threshold. In some embodiments, in response to determining that the voltage across the flying capacitor is equal to the target voltage, the MCU may generate (and output to the secondary converter) a control signal that triggers the secondary converter to switch to the inactive state such that the secondary converter stops charging the flying capacitor. That is, in some embodiments, the secondary converter is configured to run (e.g., to always be running), and to stop running in response to receiving the control signal. In one non-limiting example, the secondary converter may be configured to stop running (e.g., to only stop running) if the secondary converter receives a control signal corresponding to a "HIGH" logic level.

Additionally, in some embodiments, if the MCU determines that the voltage of the flying capacitor fails to satisfy the threshold (e.g., deviates from the target voltage), the MCU may trigger the secondary converter to run for a relatively short duration to balance the flying capacitor. In some such embodiments, the MCU may use another control signal to run the secondary converter. For example, in response to determining that the voltage across the flying capacitor is not equal to the target voltage, the MCU may generate (and output to the secondary converter), another control signal that triggers the secondary converter to switch to the default operation state such that the secondary converter resumes running and charges the flying capacitor to the target voltage. In one non-limiting example, the secondary converter may be configured run if the secondary converter receives a control signal corresponding to a "LOW" logic level.

Additionally, or alternatively, the secondary converter may be configured run if the secondary converter fails to receive the control signal corresponding to a HIGH logic level. For example, the secondary converter may be configured run in response to a lack of the control signal corresponding to the HIGH logic state, which may be due, for example, to the secondary converter not receiving the control signal and/or the MCU note generating (and outputting) the control signal to the secondary converter. In other words, the secondary converter may be configured run in the absence of the control signal corresponding to the HIGH logic state. Accordingly, the MCU may trigger the secondary converter to switch to the default operation state by refraining from generating (and/or outputting) the control signal corresponding to the HIGH logic state. By configuring a secondary converter to operate in accordance with the default operation state and to switch (to only switch) from the default operation state to the inactive state in response to a control signal corresponding to the HIGH logic state, the systems, methods provide for a secondary converter that is configured to balance flying capacitors with or without MCU intervention. By providing for a secondary converter that is configured to balance flying capacitors with or without MCU intervention, the systems, apparatuses, and methods may improve the reliability of multi-level converters, among other benefits.

Exemplary Systems, Methods, and Apparatuses

Embodiments of the present disclosure herein include systems, methods, and apparatuses for balancing flying capacitors in high power multi-level buck or boost converters for renewable and solar MPPT inverter applications, which may be implemented in various embodiments.

FIG. 1 illustrates an exemplary diagram of a system 100 configured to balance flying capacitors in high power multi-level buck or boost converters for renewable and solar MPPT inverter applications in accordance with one or more embodiments of the present disclosure.

As illustrated in the example of FIG. 1, the system 100 includes an N-level converter circuitry 104 (e.g., a multi-level converter) with a flying capacitor 106. In some embodiments, the N-level converter circuitry 104 includes a 3-level converter with and the flying capacitor 106 and four switches (e.g., S1, S2, S3, and S4). In some such embodiments, the flying capacitor 106 may be located symmetrically between at least two of the four switches. For example, the flying capacitor 106 may be located symmetrically between the four switches, such that the flying capacitor 106 may serve as a virtual power supply between a first two switches (e.g., S2 and S3) and/or the flying capacitor 106 may serve as a virtual power supply between a second two switches (e.g., S1 and S4). A performance of the N-level converter circuitry 104 may depend on a capability of the system 100 to maintain the voltage of the flying capacitor 106 at a target voltage. For example, the N-level converter circuitry 104 may incur damage if the voltage across the flying capacitor 106 deviates from the target voltage (i.e., becomes unbalanced). Moreover, the flying capacitor 106 may be configured to discharge upon startup, causing the capacitor to become unbalanced.

In accordance with various aspects of the present disclosure, the system 100 includes a secondary converter circuitry 102 that is configured to balance the flying capacitor 106 unconditionally and also at startup. For example, the secondary converter circuitry 102 may be an example of an isolated, multi-output, forward derived converter, configured to operate in an open loop. In some embodiments, the secondary converter circuitry 102 is configured to charge the flying capacitor to a target voltage (e.g., half the source voltage) in accordance with a default operation state and to switch (to only switch) from the default operation state to an inactive state in response to one or more events. Accordingly, in some embodiments, the secondary converter circuitry 102 is configured to charge the flying capacitor 106 to the target voltage unconditionally and at start up (e.g., in response to initialization).

As illustrated in the example of FIG. 1, the secondary converter circuitry 102 may be an example of a converter whose transfer function is such that output voltages of the secondary converter (e.g., a positive output voltage 112-*a* and a negative output voltage 114-*a*, as well as a positive output voltage 112-*b* and a negative output voltage 114-*b*) are equal to 50% of an input voltage 116 to the secondary converter circuitry 102. In at least one embodiment, the secondary converter circuitry 102 is an open loop, isolated, forward converter. Additionally, or alternatively, in at least one embodiment, the secondary converter circuitry 102 is a DC-DC converter cell, which is a function of a duty cycle of a pulse width modulation (PWM) signal. For example, in some embodiments, the secondary converter circuitry 102 is an open loop, isolated, forward derived DC-DC converter configured to operate at 50% of a PWM duty cycle. In some embodiments, the switches in the N-level converter circuitry 104 are controlled via one or more PWM signals output from a PWM controller (not shown). In some such embodiments, the secondary converter circuitry 102 may be configured to run in an open loop at 50% of the duty cycle of the PWM signals. In some such embodiments, the secondary converter circuitry 102 may be referred to as a PWM converter.

In some embodiments, isolation is achieved in the secondary converter circuitry 102 by incorporating a transformer into the secondary converter circuitry 102. For example, as illustrated in the example of FIG. 1, the secondary converter circuitry 102 may include a transformer 120 that provides isolation between an input stage (e.g., the input voltage 116) and an output stage (e.g., the positive output voltage 112-*a* and the negative output voltage 114-*a* and/or the positive output voltage 112-*b* and the negative output voltage 114-*b*). In some such embodiments, power is transferred between the input stage and the output stage via electromagnetic energy. The transformer 120 includes a primary winding and one or more secondary windings 118 (e.g., a secondary winding 118-*a*, a secondary winding 118-*b*).

In some embodiments, the N-level converter circuitry 104 is a 3-level converter with a single flying capacitor. In other words, in some embodiments, the N-level converter includes a single cell. In some such embodiments, the secondary converter circuitry 102 may be configured to include one secondary winding (e.g., the secondary winding 118-*a*), such that the secondary converter may provide the positive output voltage 112-*a* and the negative output voltage 114-*a* to the conductive plates of the single flying capacitor for charging. In some other embodiments, the N-level converter circuitry 104 includes multiple cells. In some such embodiments, the secondary converter circuitry 102 may include multiple secondary windings (e.g., the secondary winding 118-*a* and the secondary winding 118-*b*), such that the secondary converter circuitry 102 may provide output voltages to the multiple cells (e.g., multiple flying capacitors in the multiple cells) of the N-level converter circuitry 102. For example, the N-level converter may be an example of a 5-level converter with two flying capacitors. In such an example, the secondary converter circuitry may provide the positive output voltage 112-*a* and the negative output voltage 114-*a* to the conductive plates of a first flying capacitor (of a first cell) and may provide the positive output voltage 112-*b* and the negative output voltage 114-*b* to the conductive plates of a second flying capacitor (of a second cell).

In some embodiments, the output of the secondary converter circuitry 102 is floating. In other words, in some embodiments, the secondary converter circuitry 102 has one or more floating outputs, which are rectified and output to one or more flying capacitors. Accordingly, the one or more outputs of the secondary converter circuitry 102 may be equal to the target voltage. For example, the input voltage 116 may be equal to the source voltage, such that the output voltages (e.g., a magnitude of each of the positive output voltage 112-*a*, the negative output voltage 114-*a*, the positive output voltage 112-*b*, and the negative output voltage 114-*b*) are equal to 50% of the source voltage (i.e., the target voltage). In other words, the secondary converter circuitry 102 may use the transformer 120 to convert a source voltage (e.g., provided at an input node to the secondary converter circuitry 102) into a target voltage provided to the flying capacitor, in which the target voltage is equal to half the source voltage. In some embodiments, the output of the secondary converter circuitry 102 may be determined based on a turns ratio of the transformer 120 (and a diode 122-*a* and a diode 122-*b*). Accordingly, the transformer 120 and the diodes 122 may be configured such that the output voltages of the secondary converter circuitry 102 are equal to half the input voltage to the secondary converter circuitry 102. As illustrated in the example of FIG. 1, the secondary converter circuitry 102 may include one or more other components (e.g., switches, capacitors, inductors, other diodes), to support one or more functionalities of the secondary converter circuitry 102.

In some embodiments, the secondary converter circuitry 102 is configured to switch from the default operation state to the inactive state in response to a control signal. For example, in some embodiments, the system 100 includes an MCU 110, which may be configured to monitor the voltage across the flying capacitor 106. In some such embodiments, if the MCU 110 determines that the voltage of the flying capacitor 106 is equal to the target voltage, the MCU 110 may generate (and output to the secondary converter circuitry 102) a control signal 124 that triggers the secondary converter to switch to the inactive state such that the secondary converter circuitry 102 stops charging the flying capacitor 106. For example, the MCU 110 may generate and output a control signal that corresponds to a "HIGH" logic state. In other words, the MCU 110 may set the control signal 124 to "HIGH" to trigger the secondary converter circuitry 102 to switch to the inactive state such that the secondary converter circuitry 102 stops charging the flying capacitor 106. In some embodiments, the control signal 124 includes a strobe or enable signal. Additionally, in some embodiments, the MCU 110 may refrain from generating (e.g., and/or outputting) the control signal 124. For example, the secondary converter circuitry 102 may be configured to operate in accordance with the default operation state in response to a lack of the control signal 124. Accordingly, the MCU 110 may trigger the secondary converter circuitry 102 to switch to the default operation state by refraining from generating (and/or outputting) the control signal 124 to the secondary converter circuitry 102. In some embodiments the MCU may refrain from refraining from generating (and/or outputting) the control signal 124 by instead generating a control signal corresponding to a "LOW" logic state. In other words, the MCU 110 may set the control signal 124 to "LOW" to trigger the secondary converter circuitry 102 to switch to the default operation state such that the secondary converter circuitry 102 charges the flying capacitor 106. That is, in some embodiments, the secondary converter circuitry 102 may be configured to operate in the inactive state (e.g., an "OFF" state) when the control signal 124 is set to HIGH and to operate in the default operation state (e.g., an "ON" state) when the control signal 124 is LOW. Additionally, or alternatively, in some embodiments, the secondary converter circuitry 102 may be configured to operate in the inactive state (e.g., an "OFF" state) when the secondary converter circuitry 102 fails to receive a control signal corresponding to a HIGH logic state, such as due to the MCU 110 malfunctioning or otherwise determining not to generate and/or output a control signal corresponding to a HIGH logic state. In some embodiments, the control signal 124 is an example of a strobe or enable signal.

In some embodiments, by configuring the secondary converter to operate in accordance with the default operation state when the control signal 124 is set to LOW and to operate (only operate) in the inactive state when the control signal 124 is set to HIGH, the secondary converter may balance the flying capacitor with or without MCU intervention. Configuring the secondary converter to balance the flying capacitor with or without MCU intervention may improve the reliability of the multi-level converter, among other benefits.

In some embodiments, the MCU 110 may determine whether the voltage across the flying capacitor 106 is equal to the target voltage based on one or more signals. For example, in some embodiments, the system 100 includes a voltage sense circuitry 108, which may be configured to sense (e.g., instantaneously sense) the voltage across the flying capacitor 106. For example, the voltage sense circuitry 108 may be configured to obtain one or more signals 128, which may be indicative of the voltage across the flying capacitor 106. For example, the signals 128 may include a first voltage (VTOP) associated with a high side of the flying capacitor 106 and a second voltage (VBOT) associated with a low side of the flying capacitor, and the voltage across the flying capacitor may correspond to VTOP-VBOT. In some such embodiments, the voltage sense circuitry 108 may use a differential amplifier (e.g., and one or more other components, such as one or more resistors and/or one or more capacitors) to obtain a sample the voltage across the flying capacitor based on the signals 128. In other words, in some embodiments, the voltage sense circuitry 108 includes a differential amplifier that is configured to sample the voltage of the flying capacitor.

The voltage sense circuitry 108 may output a signal 126 to the MCU 110 based on the signals 128. The signal 126 may correspond to a sample of the voltage across the flying capacitor. In other words, the voltage sense circuitry 108 may include a differential amplifier configured to sample the voltage across the flying capacitor 106 and provide the sample to the MCU 110 via the signal 126. In some embodiments, the sampled voltage is directly proportional to the voltage across the flying capacitor 106. Additionally, in some embodiments, the MCU 110 may be configured to obtain a signal indicative of the source voltage from the N-level converter circuitry 104. In some such embodiments, the MCU 110 may compare the sample voltage to the source voltage to determine whether the voltage across the flying capacitor 106 is equal to the target voltage. For example, the MCU may use the sample voltage to determine the voltage across the flying capacitor (Vfly), and may then determine whether the source voltage (Vcc) obtained from the N-level converter is twice the voltage across the flying capacitor (e.g., whether Vfly is half Vcc). In some embodiments, the voltage sense circuitry 108 may provide for continuous monitoring of the voltage across the flying capacitor, which may lead to increased reliability, among other benefits.

FIG. 2 illustrates an exemplary diagram of a system 200 configured to balance flying capacitors in high power multi-level buck converters for renewable and solar MPPT inverter applications in accordance with one or more embodiments of the present disclosure. The system 200 may be an example of the system 100 illustrated by and described with reference to FIG. 1. For example, the system 200 includes an N-level converter circuitry 204 with a flying capacitor 206. The N-level converter circuitry 204 may be configured to convert an input voltage 218 provided at a first node of the N-level converter circuitry 204 into an output voltage 234 provided at a second node of the N-level converter circuitry 204. The input voltage 218 may be provided to the N-level converter circuitry 204 from a power source, and the output voltage 234 may be provided from the N-level converter circuitry 204 to a load 232.

As illustrated in the example of FIG. 2, the N-level converter circuitry 204 is configured to operate in a buck mode. In other words, in various embodiments, the N-level converter is an N-level buck converter configured to decrease an input voltage. In some such embodiments, the input voltage 218 to the N-level converter circuitry 204 is higher than the output voltage 234 from the N-level converter circuitry 204 to a load 232. As illustrated in the example of FIG. 2, the N-level converter circuitry 204 includes the flying capacitor 206 and multiple switches 220 (e.g., a switch 220-*a*, a switch 220-*b*, a switch 220-*c*, and a switch 220-*d*). In some embodiments, the multiple switches 220 are controlled via one or more PWM signals. For example, each of the multiple switches 220 may be controlled via a respective PWM signal. The N-level converter circuitry 204 may include one or more other components, such as a shunt resistor 236, multiple equalizing resistors 222 (e.g., an equalizing resistor 222-*a*, an equalizing resistor 222-*b*, an equalizing resistor 222-*c*, and an equalizing resistor 222-*d*), an inductor, and one or more capacitors, to support one or more functionalities of the N-level converter circuitry 204. In some embodiments, the N-level converter circuitry 204 may include an inductor current sensor 238 (inductor A current sensor) and an output current sensor 240 (Iout A current sensor).

In accordance with various aspects of the present disclosure, the system 200 also includes a secondary converter circuitry 202 that is configured to balance the flying capacitor 206 unconditionally and also at startup. The secondary converter circuitry 202 may be an example of a secondary converter circuitry illustrated by and described with reference to FIG. 1. For example, the secondary converter circuitry 202 may be an example of an isolated, multi-output, forward derived converter, configured to operate in an open loop. In some embodiments, the secondary converter circuitry 202 is configured to charge the flying capacitor 206 to a target voltage (e.g., half the source voltage) in accordance with a default operation state and to switch (e.g., to only switch) from the default operation state to an inactive state in response to one or more events. Accordingly, in some embodiments, the secondary converter circuitry 202 is configured to charge the flying capacitor 206 to the target voltage unconditionally and at start up (e.g., in response to initialization).

In some embodiments, based on the N-level converter operating in the buck mode, an auxiliary input voltage 216 to the secondary converter circuitry 202 may be include or be otherwise set to the input voltage 218 of the N-level converter. In other words, because the input voltage 218 to the N-level converter circuitry 204 is higher than the output voltage 234 from the N-level converter circuitry 204, the auxiliary input voltage 216 to the secondary converter circuitry 202 is the same as the input voltage 218 to the N-level converter circuitry 204. For example, as illustrated in the example of FIG. 2, the secondary converter circuitry 202 is configured to receive the auxiliary input voltage 216 from the input voltage 218 of the N-level converter circuitry 204. Accordingly, output voltages from the secondary converter circuitry 202 (e.g., a positive output voltage 212 and a negative output voltage 214) are equal to half of the input voltage 218. The secondary converter circuitry 202 may be configured to provide the positive output voltage 212 to a first (top) conductive plate of the flying capacitor 206 and to provide the negative output voltage 214 to a second (bottom) conductive plate of the flying capacitor 206.

In some embodiments, as illustrated in the example of FIG. 2, the secondary converter circuitry 202 (also referred to as an auxiliary converter) is configured to receive a control signal 224 from an MCU 210. The MCU 210 may be an example of an MCU illustrated by and described with reference to FIG. 1. For example, the MCU 210 may set the control signal 224 to LOW (e.g., may set the control signal 224 logic to a LOW state) to set the secondary converter circuitry 202 to run. Additionally, the MCU 210 may set the control signal 224 to HIGH (e.g., may set the control signal 224 logic to a HIGH state) to set the secondary converter circuitry 202 to stop. In other words, the secondary converter circuitry 202 may be configured to run in response to the control signal 224 logic being set to a LOW state and to stop running in response to the control signal 224 logic being set to a HIGH state.

In some examples, the MCU 210 may set the control signal 224 logic based on monitoring the voltage across the flying capacitor 206. That is, in some embodiments, the MCU 210 may be configured to sense the input voltage 218 and the flying capacitor voltage to determine whether the flying capacitor voltage deviates from half of the input voltage 218. In some embodiments, the MCU 210 may determine (e.g., measure) the flying capacitor voltage using a sample of the flying capacitor voltage (e.g., VTOP-VBOT). For example, the system 200 may include a voltage sense circuitry 208. The voltage sense circuitry 208 may be an example of voltage sense circuitry illustrated by and described with reference to FIG. 1. For example, the voltage sense circuitry 208 may be configured to sense (e.g., instantaneously sense) the voltage across the flying capacitor 206. In some embodiments, the voltage sense circuitry 208 is configured to sense (e.g., measure) the voltage across the flying capacitor 206 by obtaining a first signal 228 that is indicative of a first voltage (VTOP) associated with a high side of the flying capacitor 206 (e.g., the top conductive plate) and to obtain a second signal 230 that is indicative of a second voltage (VBOT) associated with a low side of the flying capacitor 206 (e.g., the bottom conductive plate). In some embodiments, the voltage sense circuitry may obtain the first signal 228 from a node 242-*a* and may obtain the second signal 230 from a node 242-*b*.

In some embodiments, the voltage sense circuitry 208 may determine the voltage across the flying capacitor 206 based on a difference between the first voltage and the second voltage. That is, VTOP-VBOT may correspond to a measure of the voltage across the flying capacitor 206. In some embodiments, the voltage sense circuitry 208 may be configured to output the signal 226 to the MCU 210 based on measured voltage. For example, the signal 226 may be indicative of (e.g., may correspond to) a sample of the measured voltage across the flying capacitor 206. In other words, the voltage sense circuitry 208 may be configured to sample of the voltage across the flying capacitor 206, in which the sample is directly proportional to the voltage across the flying capacitor 206, and provide the sampled voltage to the MCU 210 via the signal 226.

Additionally, or alternatively, the MCU 210 may measure the input voltage 218. For example, in some embodiments, the MCU 210 may be configured to obtain a signal that is indicative of the input voltage 218 to the N-level converter circuitry 204. In some embodiments, the MCU 210 may sense the input voltage by reading the input voltage bus. That is, in some embodiments, the MCU may obtain the signal indicative of the input voltage 218 from the input voltage bus.

FIG. 3 an exemplary diagram of a system 300 configured to balance flying capacitors in high power multi-level boost converters for renewable and solar MPPT inverter applications in accordance with one or more embodiments of the present disclosure. The system 300 may be an example of the system 100 illustrated by and described with reference to FIG. 1. For example, the system 300 includes an N-level converter circuitry 304 with a flying capacitor 306. The N-level converter circuitry 204 may be configured to convert an input voltage 318 provided at a first node of the N-level converter circuitry 304 into an output voltage 334 provided at a second node of the N-level converter circuitry 304. The input voltage 318 may be provided to the N-level converter circuitry 304 from a power source, and the output voltage 334 may be provided from the N-level converter circuitry 304 to a load 332.

As illustrated in the example of FIG. 3, the system 300 includes an N-level converter circuitry 204 configured to operate in a boost mode. In other words, in various embodiments, the N-level converter is an N-level boost converter configured to increase an input voltage. In such embodiments, the input voltage 318 to the N-level converter circuitry 204 is lower than the output voltage 334 from the N-level converter circuitry 304 to a load 332. As illustrated in the example of FIG. 3, the N-level converter circuitry 304 may include the flying capacitor 306 and multiple switches 320 (e.g., a switch 320-*a*, a switch 320-*b*, a switch 320-*c*, and a switch 320-*d*). In some embodiments, the multiple switches 320 are controlled via one or more PWM signals. For example, each of the multiple switches 320 may be controlled via a respective PWM signal. The N-level converter circuitry 304 may include one or more other components, such as multiple equalizing resistors 322 (e.g., an equalizing resistor 322-*a*, an equalizing resistor 322-*b*, an equalizing resistor 322-*c*, and an equalizing resistor 322-*d*), an inductor, and one or more capacitors, to support one or more functionalities of the N-level converter circuitry 304. In some embodiments, the N-level converter circuitry 304 may include an inductor current sensor 338 (inductor A current sensor) and an output current sensor 340 (Iout A current sensor).

In accordance with various aspects of the present disclosure, the system 300 also includes a secondary converter circuitry 302 that is configured to balance the flying capacitor 306 unconditionally and also at startup. The secondary converter circuitry 302 may be an example of a secondary converter circuitry illustrated by and described with reference to FIG. 1. For example, the secondary converter circuitry 302 may be an example of an isolated, multi-output, forward derived converter, configured to operate in an open loop. In some embodiments, the secondary converter circuitry 302 is configured to charge the flying capacitor 306 to a target voltage (e.g., half the source voltage) in accordance with a default operation state and to switch (to only switch) from the default operation state to an inactive state in response to one or more events. Accordingly, in some embodiments, the secondary converter circuitry 302 is configured to charge the flying capacitor 306 to the target voltage unconditionally and at start up (e.g., in response to initialization).

In some embodiments, based on the N-level converter operating in the boost mode, an auxiliary input voltage 316 to the secondary converter circuitry 302 may be set to (e.g., may include) the output voltage 334 of the N-level converter. In other words, because the output voltage 334 from the N-level converter circuitry 304 is higher than the input voltage 318 to the N-level converter circuitry 304, the auxiliary input voltage 316 to the secondary converter circuitry 302 is the same as the output voltage 334 from the N-level converter circuitry 304. For example, as illustrated in the example of FIG. 3, the secondary converter circuitry 302 is configured to receive the auxiliary input voltage 316 from the output voltage 334 of the N-level converter circuitry 304. Accordingly, output voltages from the secondary converter circuitry 302 (e.g., a positive output voltage 312 and a negative output voltage 314) are equal to half of the output voltage 334. The secondary converter circuitry 302 may be configured to provide the positive output voltage 312 to a first (top) conductive plate of the flying capacitor 306 and to provide the negative output voltage 314 to a second (bottom) conductive plate of the flying capacitor 306.

In some embodiments, as illustrated in the example of FIG. 3, the secondary converter circuitry 302 is configured to receive a control signal 324 from an MCU 210. The MCU 310 may be an example of an MCU illustrated by and described with reference to FIG. 1. For example, the MCU 310 may set the control signal 324 to LOW (e.g., may set the control signal 324 logic to a LOW state) to set the secondary converter circuitry 302 to run. Additionally, the MCU 310 may set the control signal 324 to HIGH (e.g., may set the control signal 324 logic to a HIGH state) to set the secondary converter circuitry 302 to stop. In other words, the secondary converter circuitry 302 may be configured to run in response to the control signal 324 logic being set to a LOW state and to stop running in response to the control signal 324 logic being set to a HIGH state.

In some examples, the MCU 310 may set the control signal 324 logic based on monitoring the voltage across the flying capacitor 306. For example, the system 300 may include a voltage sense circuitry 308. The voltage sense circuitry 308 may be an example of voltage sense circuitry illustrated by and described with reference to FIG. 1. For example, the voltage sense circuitry 308 may be configured to sense (e.g., instantaneously sense) the voltage across the flying capacitor 306. In some embodiments, the voltage sense circuitry 308 is configured to sense (e.g., measure) the voltage across the flying capacitor 306 by obtaining a first signal 328 that is indicative of a first voltage (VTOP) associated with a high side of the flying capacitor 306 (e.g., the top conductive plate) and to obtain a second signal 330 that is indicative of a second voltage (VBOT) associated with a low side of the flying capacitor 306 (e.g., the bottom conductive plate). In some embodiments, the voltage sense circuitry 308 may obtain the first signal 328 from a node 342-*a* and the second signal 330 from a node 342-*b*.

In some such embodiments, the voltage sense circuitry 308 may determine the voltage across the flying capacitor 306 based on a difference between the first voltage and the second voltage. That is, VTOP-VBOT may correspond to a measure of the voltage across the flying capacitor 306. In some embodiments, the voltage sense circuitry 308 may be configured to output the signal 326 to the MCU 310 based on measured voltage. For example, the signal 326 may correspond to a sample of the measured voltage across the flying capacitor 306. In other words, the voltage sense circuitry 308 may be configured to obtain a sample of the voltage across the flying capacitor 306 and provide the sample to the MCU 310 via the signal 326. In some embodiments, the sample is directly proportional to the voltage across the flying capacitor 306. The MCU 310 may also be configured to receive a signal from the N-level converter circuitry 304, which may be indicative of the output voltage 334. That is, the MCU 310 may be configured to sense the output voltage 334 and the flying capacitor voltage to determine whether the flying capacitor voltage devices from half of the output voltage 334. The MCU 310 may sense the output voltage 334 by reading the output voltage bus. In other words, the MCU 310 may obtain the signal indicative of the output voltage 334 from the output voltage bus.

FIG. 4A illustrates an exemplary graph 400-*a* of a flying capacitor voltage of a flying capacitor in a system configured to balance flying capacitors in high power multi-level buck or boost converters for renewable and solar MPPT inverter applications in accordance with one or more embodiments of the present disclosure. The graph 400-*a* illustrates a voltage bus signal 402-*a* (Vbus) and a flying capacitor voltage signal 404-*a* (Vfly) as a function of time. A position 406-*a* in the graph 400-*a* illustrates a change in the flying capacitor voltage 404-*a* in response to a load of the system decreasing by 50% (e.g., load step down of 50%).

FIG. 4B illustrates an exemplary graph 400-*b* of a flying capacitor voltage of a flying capacitor in a system configured to balance flying capacitors in high power multi-level buck or boost converters for renewable and solar MPPT inverter applications in accordance with one or more embodiments of the present disclosure. The graph 400-*b* illustrates a voltage bus signal 402-*b* (Vbus) and a flying capacitor voltage signal 404-*b* (Vfly) as a function of time. A position 406-*b* in the graph 400-*b* illustrates a change in the flying capacitor voltage 404-*b* in response to a load of the system increasing by 50% (e.g., load step up 50%). In some embodiments, one or more systems and methods for balancing flying capacitors in high power multi-level buck or boost converters, as described herein, may provide for reducing the slope of the flying capacitor voltage signal 404-*a* at the position 406-*a* and the flying capacitor voltage signal 404-*b* at the position 406-*b*, which may reduce a likelihood of (e.g., may prevent) uncontrolled imbalance of the flying capacitor and failure of the multi-level converter.

FIG. 5 illustrates a flowchart 500 of operations that support systems and methods to balance flying capacitors in high power multi-level buck or boost converters for renewable and solar MPPT inverter applications in accordance with one or more embodiments of the present disclosure. The operations of the flowchart 500 may be implemented in a system, such as a system illustrated by and described with reference to FIGS. 1-3.

At operation 502, an MCU (or another suitable device) may initialize (e.g., start) at least a multi-level converter circuitry and an isolated secondary converter circuitry. The multi-level converter circuitry may be an example of a multi-level converter circuitry illustrated by and describe with reference to FIGS. 1-3. For example, the multi-level converter circuitry may include at least a flying capacitor. The isolated secondary converter circuitry (e.g., an isolated, multi-output, forward derived converter) may be an example of a secondary converter circuitry illustrated by and described with reference to FIGS. 1-3. For example, the isolated secondary converter circuitry may be configured to charge the flying capacitor in accordance with a default operation state in response to initialization.

At operation 504, the MCU may determine that a voltage across the flying capacitor satisfies a threshold. For example, the MCU may determine that the voltage across the flying capacitor is equal to half of a source voltage.

At operation 506, the MCU may cause the isolated secondary converter circuitry to switch from the default operation state to an inactive state based on the voltage satisfying the threshold. For example, the MCU may cause the isolated secondary converter circuitry to operate in the inactive state such that the isolated secondary converter circuitry may stop charging the flying capacitor (e.g., to increase efficiency).

In one non-limiting example, when the multi-level converter circuitry and the isolated secondary converter circuitry start (e.g., initialized at operation 502), the MCU may operate a PWM controller for the multi-level converter circuitry (e.g., a PWM controller which is used to output PWM signals to one or more switches of the multi-level converter circuitry) in an OFF state. Additionally, the MCU may set a control signal for the isolated secondary converter circuitry to a LOW state, such that the isolated secondary converter circuitry may operate in accordance with the default operation state (e.g., may operate in an ON state). In some embodiments, the isolated secondary converter is configured to operate at 50% of a duty cycle associated with the PWM controller.

In some embodiments, within a few milliseconds of the multi-level converter circuitry and the isolated secondary converter circuitry starting, the flying capacitor is discharged (e.g., the voltage across the flying capacitor goes to 0 V) and the voltage across one or more switches becomes half the source voltage. In some such embodiments, the voltage of across the one or more switches becomes half the source voltage based on one or more equalizing resistors (which may be on the order of about 500,000Ω to precent loss). Additionally, within a few milliseconds of the multi-level converter circuitry and the isolated secondary converter circuitry starting, the isolated secondary converter circuitry, which is operating in an ON state and running at 50% of the duty cycle of the PWM controller due to the control signal being set to LOW, charges the flying capacitor to half the source voltage.

In some embodiments, the MCU may measure the source voltage (e.g., via a voltage bus) and the voltage across the flying capacitor (e.g., via a voltage sense circuitry). In some such embodiments, at operation 504, the MCU may determine that the source voltage is equal to twice the voltage of the flying capacitor. In other words, the MCU may determine that the voltage across the flying capacitor is half of the source voltage.

In some embodiments, at operation 506, in response to determining that that the voltage across the flying capacitor is half of the source voltage, the MCU may operate the PWM controller in an ON state and may set the control signal to HIGH, to operate the isolated secondary converter circuitry in the inactive state (e.g., in an OFF state, which may lead to increased efficiency).

In some embodiments, while the multi-level converter circuitry is running, the MCU may determine to set the control signal to LOW (to cause the isolated secondary converter circuitry to switch to the default operation state from the inactive state) in response to one or more events. The MCU may set the control signal to LOW so that isolated secondary converter circuitry resumes the default operation mode (e.g., starts again) and charges the flying capacitor to half the source voltage (e.g., to exact half of the source voltage). In some embodiments, the MCU may set the control signal to LOW if the MCU (e.g., the MCU firmware) detects an increase in an output load of the multi-level converter circuitry or a decrease in the source voltage, such that the voltage of the flying capacitor falls below a threshold voltage (e.g., is less than half the source voltage). Additionally, or alternatively, the control signal may be set to LOW (e.g., forced to LOW, turned off) if the MCU malfunctions and/or a watchdog event occurs. For example, the control pin may be release if the MCU malfunctions and/or a watchdog event occurs. In some embodiments, after the voltage of the flying capacitor reaches half the source voltage, the MCU may set the control signal to HIGH to cause the isolated secondary converter circuitry to operate in the OFF state. Additionally, in some such embodiments, the MCU may cause normal PWM compensation to resume.

In some embodiments, while the multi-level converter circuitry is running, the MCU may determine to set the control signal to HIGH (to cause the isolated secondary converter circuitry to switch from the default operation state to the inactive state) in response to one or more other events. The MCU may set the control signal to HIGH so that isolated secondary converter circuitry stops charging the flying capacitor (e.g., to increase efficiency). For example, the MCU may detect an increase in the source voltage or a decrease in the output load such that the voltage of the flying capacitor exceeds the threshold voltage (e.g., is greater than half the source voltage). That is, during running, the input voltage to the multi-level converter circuitry may suddenly increase or the load may suddenly decrease, causing the voltage across the flying capacitor to exceed the source voltage. In some such embodiments, within a few milliseconds, the MCU may cause the PWM controller to operate in the OFF state (e.g., all PWM switches may be stopped momentarily). Additionally, within a few milliseconds, the MCU may cause the isolated secondary converter circuitry to operate in the inactive state by setting the control signal to HIGH. In some embodiments, after setting the control signal to HIGH, the MCU may cause the PWM controller to operate in the ON state and in accordance with a particular sequence, such that equalizing resistors in the multi-level converter circuitry drain the voltage of the flying capacitor to half the source voltage. The MCU may then initiate normal operation.

In some embodiments, by configuring the isolated secondary converter to operate in the inactive state in response to the control signal being set to HIGH, the flying capacitor may be balanced unconditionally and at startup. In other words, startup and load transient balance is unconditionally provided by the isolated secondary converter circuitry and the control signal. The systems, apparatuses, and methods to balance flying capacitors in high power multi-level buck and boost converters, as described herein, may therefore provide for independent and reliable operation and startup of N-level converters.

For example, a performance of an N-level converter may depend on the voltage of a flying capacitor in the N-level converter being half the source voltage and the present disclosure provides systems, apparatuses, and methods for unconditional balancing of the flying capacitor voltage, even if the MCU malfunctions or is reset (e.g., due to a watchdog event). In some examples, during start-up and transient events, the flying capacitor balance may be disturbed and the systems, apparatuses, and methods to balance flying capacitors, as described herein, enable the flying capacitor to return to balance with or without MCU intervention. For example, in accordance with one or more systems, apparatuses, and/or methods of the present disclosure, the isolated secondary converter is configured to run (e.g., to always be running) and to stop (e.g., to only stop) if the MCU sets the control signal to HIGH. In some embodiments, the systems, apparatus, and methods may also provide for equalizing resistors to balance the flying capacitor during extreme anomalies and/or protection events. The systems, apparatuses, and methods of the present disclosure provide for cost savings and a simplified code flow.

FIG. 6 illustrates an exemplary device 600 that support systems and methods to balance flying capacitors in high power multi-level buck or boost converters for renewable and solar MPPT inverter applications in accordance with one or more embodiments of the present disclosure. FIG. 6 may be implemented by one or more aspects illustrated by and described with reference to FIGS. 1-3, 4A, 4B, and 5. The device 600 may be a device for an application, apparatus, and/or a system. The device 600 may be a device for renewable and solar inverter MPPT applications, or a device for another application that uses multi-level converters. For example, the device 600 may be a device for a system illustrated by and described with reference to FIGS. 1-3. The device 600 may be a system and/or apparatus that includes a processor 602, memory 604, communication circuitry 606, input/output circuitry 608, and capacitor balancing circuitry 610, and all of which may be connected by a bus or buses 612. It should be appreciated that, in some embodiments, the device 600 may include or be otherwise coupled to one or more other components, such as a power source(s) and/or a load(s). The power source(s) and/or a load(s) may be internal or external to the device 600. For example, a power source may be coupled to the capacitor balancing circuitry 610 via a bus or one or more connectors. Additionally, or alternatively, a load may be coupled to the capacitor balancing circuitry 610 via a bus or one or more connectors.

The processor 602, although illustrated as a single block, may be comprised of a plurality of components and/or processor circuitry. The processor 602 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits. In various embodiments, the processor 602 may be configured to execute applications, instructions, and/or programs stored in the processor 602, or otherwise accessible to the processor 602. When executed by the processor 602, these applications, instructions, and/or programs may enable the execution of one or a plurality of the operations and/or functions described herein. Regardless of whether it is configured by hardware, firmware/software methods, or a combination thereof, the processor 602 may comprise entities capable of executing operations and/or functions according to the embodiments of the present disclosure when correspondingly configured. For example, the processor 602 may be configured to initialize the multi-level converter circuitry 614 and/or the secondary converter circuitry 616. Additionally, or alternatively, the processor 602 (e.g., in combination with the memory 604 and/or a voltage sense circuitry 618) may be configured to determine that a voltage across a flying capacitor in the multi-level converter circuitry 614 satisfies a threshold. Additionally, or alternatively, the processor 602 may be configured to cause the secondary converter circuitry 616 to switch from a default operation state to an inactive state based on the voltage satisfying the threshold.

The memory 604 may comprise, for example, a volatile memory, a non-volatile memory, or a certain combination thereof. Although illustrated as a single block, the memory 604 may comprise a plurality of memory components. In various embodiments, the memory 604 may comprise, for example, a random access memory, a cache memory, a flash memory, a hard disk, a circuit configured to store information, or a combination thereof. The memory 604 may be configured to write or store data, information, application programs, instructions, etc. so that the processor 602 may execute various operations and/or functions according to the embodiments of the present disclosure. For example, in at least some embodiments, a memory 604 may be configured to buffer or cache data for processing by the processor 602. Additionally, or alternatively, in at least some embodiments, the memory 604 may be configured to store program instructions for execution by the processor 602. The memory 604 may store information in the form of static and/or dynamic information. When the operations and/or functions are executed, the stored information may be stored and/or used by the processor 602.

The communication circuitry 606 may be implemented as a circuit, hardware, computer program product, or a combination thereof, which is configured to receive and/or transmit data from/to another component or apparatus. The computer program product may use computer-readable program instructions stored on a computer-readable medium (e.g., memory) and executed by a processor 602. In various embodiments, the communication circuitry 606 (as with other components discussed herein) may be at least partially implemented as part of the processor 602 or otherwise controlled by the processor 602. The communication circuitry 606 may communicate with the processor 602, for example, through a bus 612. Such a bus 612 may connect to the processor 602, and it may also connect to one or more other components of the processor 602. The communication circuitry 606 may be comprised of, for example, transmitters, receivers, transceivers, network interface cards and/or supporting hardware and/or firmware/software and may be used for establishing communication with another component(s), apparatus(es), and/or system(s). The communication circuitry 606 may be configured to receive and/or transmit data that may be stored by memory by using one or more protocols that can be used for communication between components, apparatuses, and/or systems.

The input/output circuitry 608 may communicate with the processor 602 to receive instructions input by an operator and/or to provide audible, visual, mechanical, or other outputs to an operator. The input/output circuitry 608 may comprise supporting devices, such as a keyboard, a mouse, a user interface, a display, a touch screen display, lights (e.g., warning lights), indicators, speakers, and/or other input/output mechanisms. The input/output circuitry 608 may comprise one or more interfaces to which supporting devices may be connected. In various embodiments, aspects of the input/output circuitry 608 may be implemented on a device used by the operator to communicate with the processor 602. The input/output circuitry 608 may communicate with memory, the communication circuitry 606, and/or any other component, for example, through a bus 612.

The capacitor balancing circuitry 610 may be an example of a system, or a portion thereof, illustrated by and described with reference to at least FIGS. 1-3. For example, the capacitor balancing circuitry 610 may include the multi-level converter circuitry 614, the secondary converter circuitry 616, and the voltage sense circuitry 618, which may be examples of the corresponding circuitry illustrated by and described with reference to FIGS. 1-3, 4A, 4B, and 5. The multi-level converter circuitry 614 may include a flying capacitor and multiple switches (e.g., 4 switches). The multi-level converter circuitry 614 may be configured to operate in accordance with a buck mode or a boost mode. In some embodiments, the voltage sense circuitry 618 may be configured to sense a voltage across the flying capacitor and output (e.g., to the processor 602) a signal indicative of the sensed voltage. In some embodiments, the signal comprises a sample of the sensed voltage. The secondary converter circuitry 616 may be an example of an isolated secondary converter (e.g., an isolated, multi-output, forward derived converter) configured to charge the flying capacitor to a target voltage in accordance with a default operation state and to switch from the default operation state to an inactive state in response to at least a first event. In some embodiments, the secondary converter circuitry may be configured to run (e.g., to always be running) in accordance with the default operation state and to stop (e.g., to only stop) if the secondary converter circuitry 616 receives a controls signal (e.g., a control signal set to HIGH).

The device 600 may be implement in hardware, software, or a combination of hardware and software. In various embodiments, the device 600, or portions thereof, may be embodied in an integrated circuit, a MCU (e.g., virtual machine running in an MCU), and/or the like. It should be readily appreciated that the embodiments of the systems, apparatuses, and methods described herein may be configured in various additional and alternative manners in addition to those expressly described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. A system comprising:

a multi-level converter circuitry configured to convert a first voltage provided at a first node into a second voltage provided at a second node, wherein the multi-level converter circuitry includes at least a flying capacitor and a plurality of switches coupled to the flying capacitor; and an isolated secondary converter circuitry configured to charge the flying capacitor to a target voltage in accordance with a default operation state, wherein the isolated secondary converter circuitry is configured to switch from the default operation state to an inactive state in response to at least a first event.

2. The system of claim 1, wherein the system further comprises a control circuitry configured to output a first control signal to the isolated secondary converter circuitry in response to detecting the first event, and wherein the isolated secondary converter circuitry is configured to operate in accordance with the inactive state in response to receiving the first control signal.

3. The system of claim 2, wherein the control circuitry is configured to refrain from outputting the first control signal to the isolated secondary converter circuitry in response to detecting a second event, and wherein the isolated secondary converter circuitry is configured to operate in accordance with the default operation state in the absence of the first control signal.

4. The system of claim 3, wherein the control circuitry is configured to refrain from outputting the first control signal for a first duration that is based at least in part on a second duration over which the isolated secondary converter circuitry charges the flying capacitor to the target voltage.

5. The system of claim 3, wherein the first event comprises a voltage across the flying capacitor satisfying a threshold associated with the flying capacitor, and wherein the second event comprises the voltage failing to satisfy the threshold.

6. The system of claim 5, wherein the threshold is based at least in part on the target voltage.

7. The system of claim 1, wherein the isolated secondary converter circuitry is configured to operate in an open loop.

8. The system of claim 1, wherein the isolated secondary converter circuitry is configured to charge the flying capacitor by converting a reference voltage provided at a third node into the target voltage, and wherein the reference voltage comprises the first voltage or the second voltage based at least in part on an operation mode of the multi-level converter circuitry.

9. The system of claim 8, wherein the target voltage comprises half the reference voltage.

10. The system of claim 8, wherein the first voltage is higher than the second voltage based at least in part on the multi-level converter circuitry operating in accordance with a first operation mode, and wherein the reference voltage comprises the first voltage based at least in part on the first voltage being higher than the second voltage.

11. The system of claim 10, wherein the first operation mode comprises a buck mode.

12. The system of claim 8, wherein the second voltage is higher than the first voltage based at least in part on the multi-level converter circuitry operating in accordance with a second operation mode, and wherein the reference voltage comprises the second voltage based at least in part on the second voltage being higher than the first voltage.

13. The system of claim 12, wherein the second operation mode comprises a boost mode.

14. The system of claim 1, wherein the plurality of switches comprises at least four switches.

15. An apparatus comprising:

at least one processor; and at least one non-transitory memory having computer program code stored thereon that, in execution with the at least one processor, causes the apparatus at least to:

initialize at least a multi-level converter circuitry and an isolated secondary converter circuitry, wherein the multi-level converter circuitry includes at least a flying capacitor, and wherein the isolated secondary converter circuitry is configured to charge the flying capacitor in accordance with a default operation state in response to initialization;

determine that a voltage across the flying capacitor satisfies a threshold; and cause the isolated secondary converter circuitry to switch from the default operation state to an inactive state based at least in part on the voltage satisfying the threshold.

16. The apparatus of claim 15, wherein, to cause the isolated secondary converter circuitry to switch from the default operation state to the inactive state, the computer program code, in execution with the at least one processor, causes the apparatus at least to:

cause a control circuitry to output a first control signal to the isolated secondary converter circuitry, wherein the isolated secondary converter circuitry is configured to operate in accordance with the inactive state in response to receiving the first control signal.

17. The apparatus of claim 16, wherein the computer program code, in execution with the at least one processor, causes the apparatus at least to:

determine that a second voltage across the flying capacitor fails to satisfy the threshold; and cause the isolated secondary converter circuitry to switch from the inactive state to the default operation state based at least in part on the second voltage failing to satisfy the threshold.

18. The apparatus of claim 17, wherein, to cause the isolated secondary converter circuitry to switch from the inactive state to the default operation state, the computer program code, in execution with the at least one processor, causes the apparatus at least to:

cause the control circuitry to refrain from outputting the first control signal to the isolated secondary converter circuitry, wherein the isolated secondary converter circuitry is configured to operate in accordance with the default operation state in the absence of the first control signal.

19. A method comprising:

initializing at least a multi-level converter circuitry and an isolated secondary converter circuitry, wherein the multi-level converter circuitry includes at least a flying capacitor, and wherein the isolated secondary converter circuitry is configured to charge the flying capacitor in accordance with a default operation state in response to initialization;

determining that a voltage across the flying capacitor satisfies a threshold; and causing the isolated secondary converter circuitry to switch from the default operation state to an inactive state based at least in part on the voltage satisfying the threshold.

20. The method of claim 19, wherein causing the isolated secondary converter circuitry to switch from the default operation state to the inactive state comprises:

causing a control circuitry to output a first control signal to the isolated secondary converter circuitry, wherein the isolated secondary converter circuitry is configured to operate in accordance with the inactive state in response to receiving the first control signal.

* * * * *